FIG. 9.     SCALE 1 DIVISION = 1000 yds

FIG. 4.

FIG.5.
$\alpha=0$
$|I_1|=|I_2|$
ZERO CONTOUR

FIG.6.
$\alpha=0$
$|I_1|>|I_2|$
ZERO CONTOUR

FIG.7.
$\alpha=0$
$|I_1|>|I_2|$
ZERO CONTOUR

FIG.8.
ZERO CONTOUR
$\alpha=0$

3,035,772
CIVIL DEFENSE TRAINING EQUIPMENT
George Vernon Hough, Derby, Richard Harry Rhead Cronin, Hottun, and Raymond John Cox, Wantage, England; said Hough and said Cronin assignors to The Plessey Company Limited, Ilford, England, a British company
Filed Jan. 3, 1957, Ser. No. 632,396
12 Claims. (Cl. 235—184)

This invention relates to systems for aiding the training of Civil Defense personnel, using magnetic field patterns to simulate nuclear weapon fall-outs.

Existing methods of training for nuclear weapon defense consist in the location of several weak radio-active sources, and the use of sensitive Geiger counters for plotting the resultant field of radio-activity. The disadvantages of this method are, firstly, that the activity which can be measured extends for only a very short range around the location of the sources, and, secondly, that there is no means of simulating the decay of activity with time, which is an essential feature in training under realistic conditions. It is an object of the invention to provide possibilities for the simulation of the activity by means of some other property. Another object is to provide a method of simulation which permits a number of exercises involving different distribution patterns to be carried out simultaneously with a minimum of mutual interference within a relatively small area since a magnetic field is particularly suitable as a simulator owing to the great ease with which the attenuation of the field with distance from the centre of the "burst" can be adjusted to simulate particular conditions of the burst of a nuclear weapon.

In accordance with one feature of our invention as at present conceived, the simulation of contours of radiation intensity resulting from the assumed burst of a nuclear weapon is effected by means of audio-frequency alternating magnetic fields set up by a configuration of one or more cables laid on or below the surface of the earth and supplied with current at a predetermined frequency or a plurality of frequencies.

The cable may be in the form of a closed loop or loops for the generation of re-entrant contours.

A plurality of closed loops may be operated at more than one frequency in association with detecting means tuned to two frequencies whereby zones of zero signal can be obtained in which the two equal signals at two frequencies may, after rectification, produce a zero signal on the indicating means.

A substantially straight cable with earth returns at each end may be used to generate linear contours to simulate the effect of a burst at a considerable distance from the training area. Then the cable or cables may be of considerable length in comparison with the training area. Each of a plurality of cables may be supplied with current at a different frequency.

The detecting instrument may be provided with an integrating facility enabling an electrical charge to be applied to known types of electrometer dosimeters to simulate the accumulation of radiation dosage.

Magnetic field patterns of almost any shape and size may be established by the current in an appropriately designed cable layout which may lie within the forbidden zone immediately surrounding the supposed burst. The cables are energised by alternating current supplied from a power amplifier. Automatic provision is made for the current amplitude to be attenuated with time according to any derived law, so that the entire field decays with time in consequence. The dose-rate meter may be simulated by a small amplifier and detecting coil housed in a case exactly resembling it in appearance and operation.

It will be seen that thus far the analogy of leader cable techniques is very close. However, it is desirable to make provision for a dosimeter. In practice an integrated dose is registered on a quartz fibre instrument the size of a fountain pen carried in the pocket. It is not practicable to design a self-contained instrument of that size capable of integrating the magnetic field, but the integrating operation can be incorporated in the dose-rate meter case, necessitating insertion of the quartz fibre instrument in a suitable aperture when it is required to take a reading.

Distortion of the field is liable to occur in the vicinity of buildings, cables, metal objects providing automatic simulation of radiation behaviour under irregular conditions.

In the description that follows, reference will be made to FIGS. 1 to 20 of the accompanying drawings. The several figures of the drawings will be described as they are referred to in the course of the following discussion.

Figure 1:
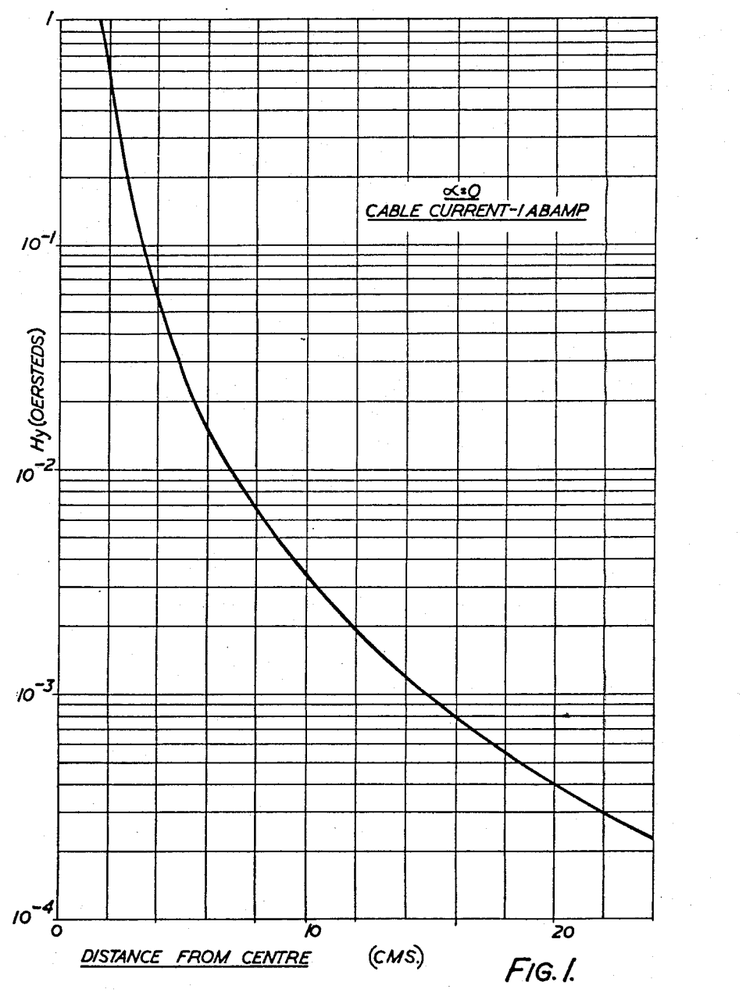

One embodiment of the invention is the two-frequency loop system. In considering this system it will first be useful to consider a circular loop of cable laid on the ground and fed with alternating current. At ground level, contours of constant field strength consist of circles of increasing diameter, concentric with the cable. FIG. 1 presents the variation of field strength with radial distance from a circle of 1 cm. radius carrying 1 abamp. of current with radiation $\alpha=0$. ($\alpha$ stands for the value $8\pi\rho f$, wherein $f$ is the frequency and $\rho$ is the ground conductivity in absolute ohm centimetres.) This is a convenient basic characteristic which can be scaled up to any required dimensions.

In the absence of wind, radiation contours could be assumed to be circles concentric with the burst. No information is yet available concerning the rate of attenuation with distance in this case, but it may coincide with that of FIG. 1. A first attempt at control could therefore be variation of loop size in conjunction with current amplitude within the limits of space available.

It is obviously necessary to provide for a close control of field-strength attenuation with distance, so that correct conditions may be simulated and allowances made for practical conditions.

Consider a basic circle of 1 cm. radius, together with a second and concentric circle of ⅝ cm. radius. Let the outer circle carry a fixed current of 1 abamp., and the inner circle be fed in antiphase, $\alpha$ still being zero. As the inner current is raised in amplitude, a concentric contour of zero field-strength moves towards the centre, providing a wide range of attenuation control. The field strength rises outside the zero contour for a short distance, but it will be shown later how this spurious external field may be removed if desired. Further attenuation control may be exercised by varying the relative circle diameters or by the addition of further circles of cable, but it is not anticipated that a total of two would need to be exceeded.

Figure 2:
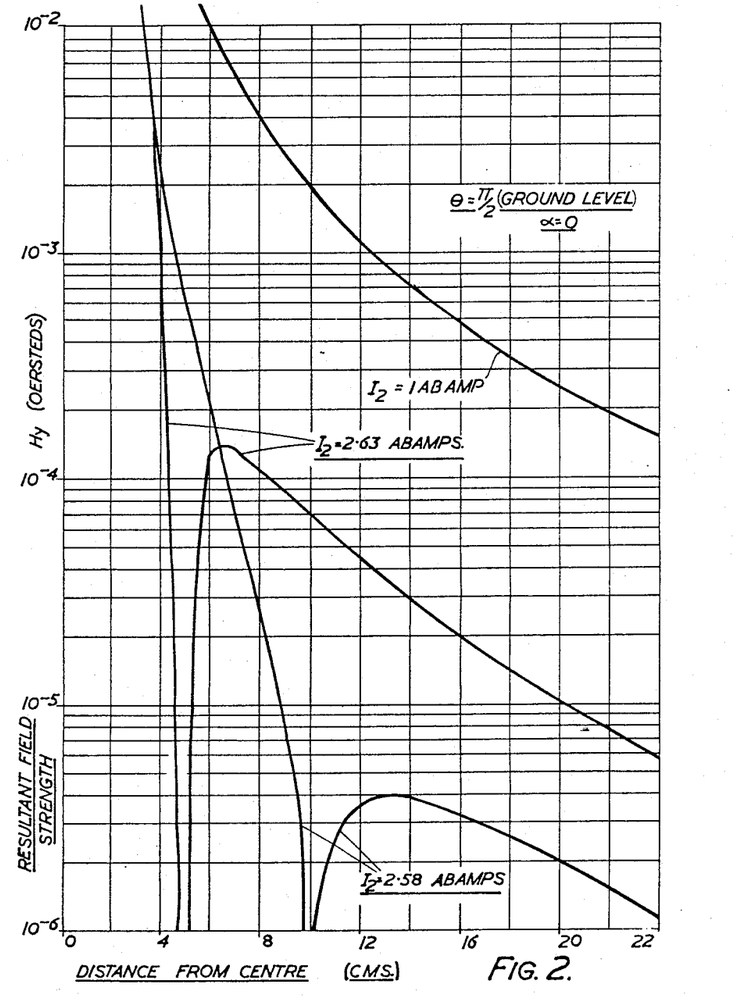

FIG. 2 shows field-strength curves in this concentric-circles case for various values of cable current I in the inner cable.

In the presence of wind the pattern may be assumed, as a first approximation, to take on an eccentric character, shifting the centre of the inner cable in a two-circle layout.

A combination of relative positions and current amplitudes can be found to situate the zero contour in the required eccentric position.

Figure 3:
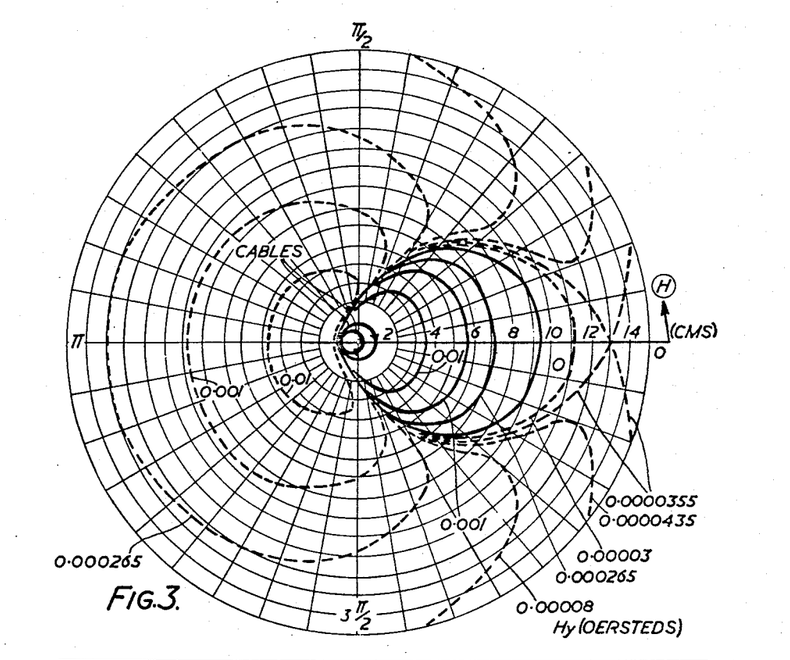
Figure 4:
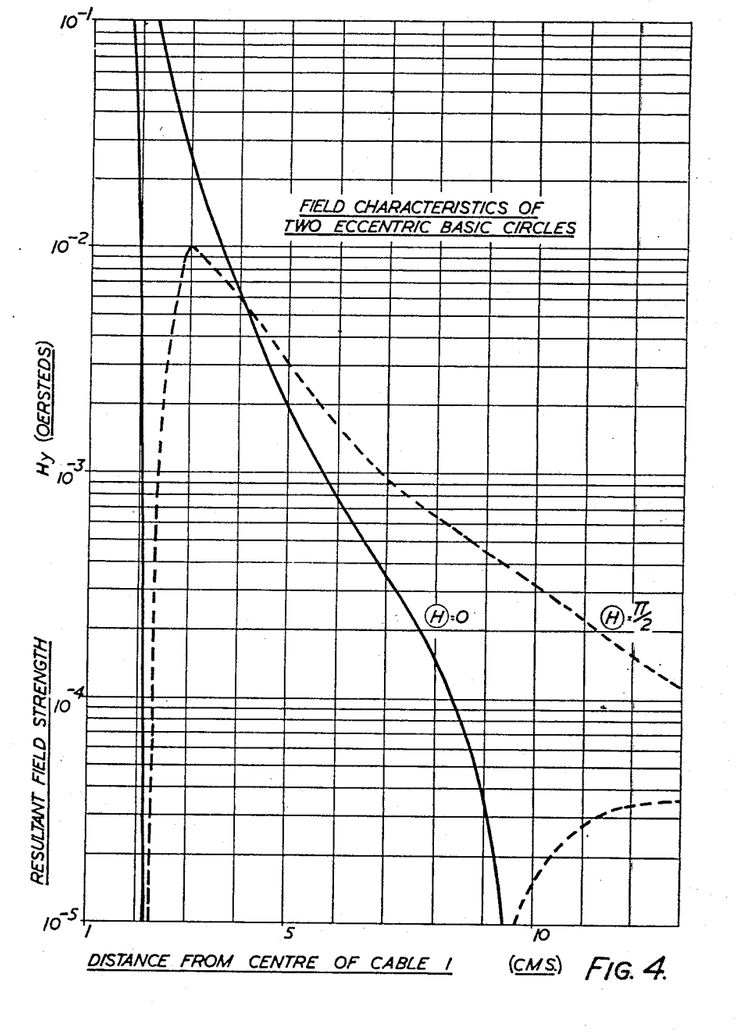

A typical pattern plan is shown in FIG. 3 while two radial sections, respectively corresponding to radiation 0 and $$\frac{\pi}{2}$$

are shown in FIG. 4. It will be seen that the spurious pattern outside the zero contour now becomes serious, particularly on the "windward" side ($M=\pi$).

The two-loop layouts just described have been considered with currents at the same frequency in antiphase. In practice, due to the effects of the detecting coil dimensions and $\alpha$, the zero contour becomes a locus of minima which has appreciable amplitude at the rear of the pattern. It is possible to remove the spurious field occurring outside the locus of minima and convert it to a zero contour in each case by employing a separate frequency for each loop. The zero contour is defined by the cancellation locus of the two field moduli, and when separate frequencies are used, it is possible to distinguish between them. Outside the zero contour it is the field from the inner loop which becomes prominent and under this condition it can be arranged that no signal is presented. Hence, referring to FIG. 3, all field outside the zero contour may be erased. A further point of practical importance arises in that the two frequencies are handled by separate channels in the detecting instrument, and the resulting higher signal level at the input gives an improved signal-to-noise ratio.

There are several other methods of obtaining the desired contour shapes.

Figure 5:
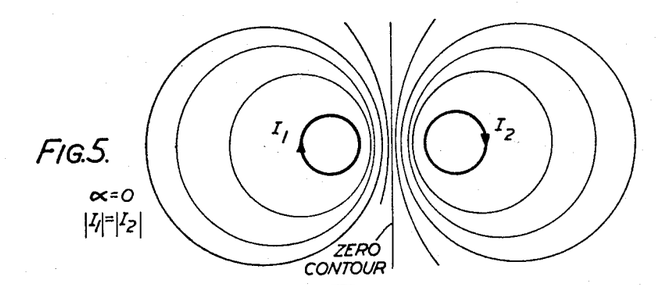

It has been shown that the simple basic circle has a limited attenuation characteristic. Consider two circles placed back to back with equal currents in antiphase as in FIG. 5. A zero line is established between them together with a series of eccentric and almost circular contours symmetrically disposed about it. If it is desired to suppress the rear image, this can be achieved by using two frequencies and arithmetic subtraction. The rate of attenuation at the rear of the pattern may be made very rapid by close positioning of the circles. The field changes from infinity to zero over any desired distance.

Figures 6, 7:
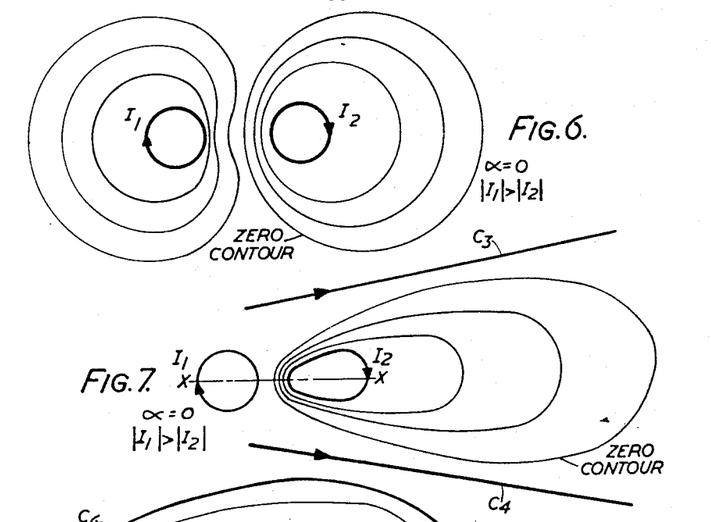

If the current in the rear cable is increased, the zero line is no longer the axis of symmetry. It becomes the outermost contour of the pattern as shown in FIG. 6. By relative current variation the leeward attenuation may be varied between wide limits.

Some method is obviously required to compress the circular contours into oval lobes or ellipses. If a basic loop is changed in shape in an attempt to achieve this, contours follow the shape of the loop only in close proximity to it: they tend a very short distance away to become circular. A cumbersome method would be to place three pairs of circles side by side appropriately phased.

The desired effect can be achieved with a high degree of flexibility by adopting the layout illustrated in FIG. 7. Two loops are arranged with relative currents set to project the required leeward attenuation.

Two straight cables $C_3$ and $C_4$ at a different frequency with equal currents in phase are laid symmetrically disposed about the major axis $x-x$ as shown. The field due to the loops at the first frequency is detected and handled by one channel, and that at the second frequency due to the straight cables by a second channel which monitors the gain of the first. It will be observed that on the major axis the field due to the straight cables is zero and hence the main field signal is uncontrolled, whereas elsewhere the monitored gain characteristic is brought into operation to produce the effect shown in the diagram. The extent to which the lobes are compressed may be controlled by varying the current amplitude in the straight cables. Spurious behaviour at the rear of the pattern may be suppressed by an extension of the gain control cables. It is clear that the gain of the main channel may be reduced to zero in the vicinity of the outer cables. Hence it is possible to confine the effect of the main field within the zero contour.

Figure 8:
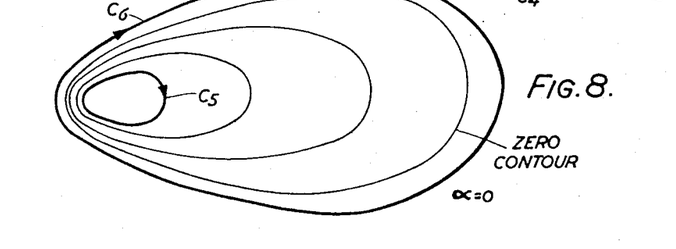

FIG. 8 shows a layout and pattern for the circumferential equality system. Two loops $C_5$ and $C_6$ are used with currents at the same frequency in phase, the outer loop $C_6$ being larger than usual, situated outside the useful area of the pattern. The relative currents are so arranged that a contour of zero field strength is placed where desired. Under these conditions a spurious field occurs outside the zero contour, but this can be avoided by using two frequencies.

The outer cable $C_6$ in FIG. 8 can be alternatively arranged to give monitored gain control, forming the basis of a circumferential monitored gain control system. It will be noted in this case that the control characteristic is quite different from that previously discussed because of changed phase disposition. It is possible that a further control cable would be necessary at the rear of the pattern. The systems discussed up to this point are intended as attempts at simulation of entire radiation patterns applicable to any scale. However, there are applications where, for instance, only a small section of a larger pattern is required resulting in less complex contours. A simplified requirement of this type can be met using an earth return layout rather than a series of loops.

In the simplest form the layout merely consists of a straight cable of convenient length energised at one end and earthed at both. The field pattern except for end effects becomes a series of approximately parallel contours symmetrically disposed on either side of the cable. Since a single frequency is used, the detecting instrument can be reduced to minimum complexity. A straight cable is purely arbitrary, and the layout may be as desired to produce local irregularities. However, a straight cable will be considered in the following discussion.

Figure 9:
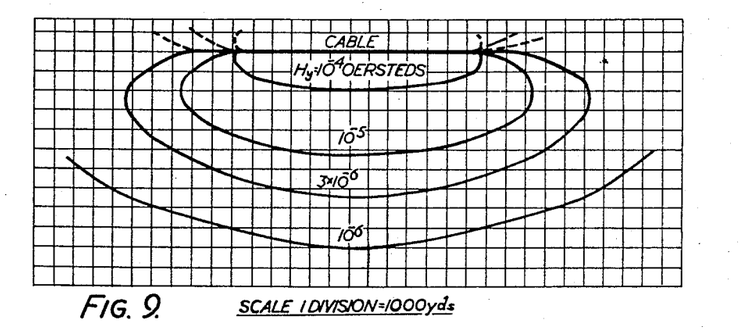
Figure 10:
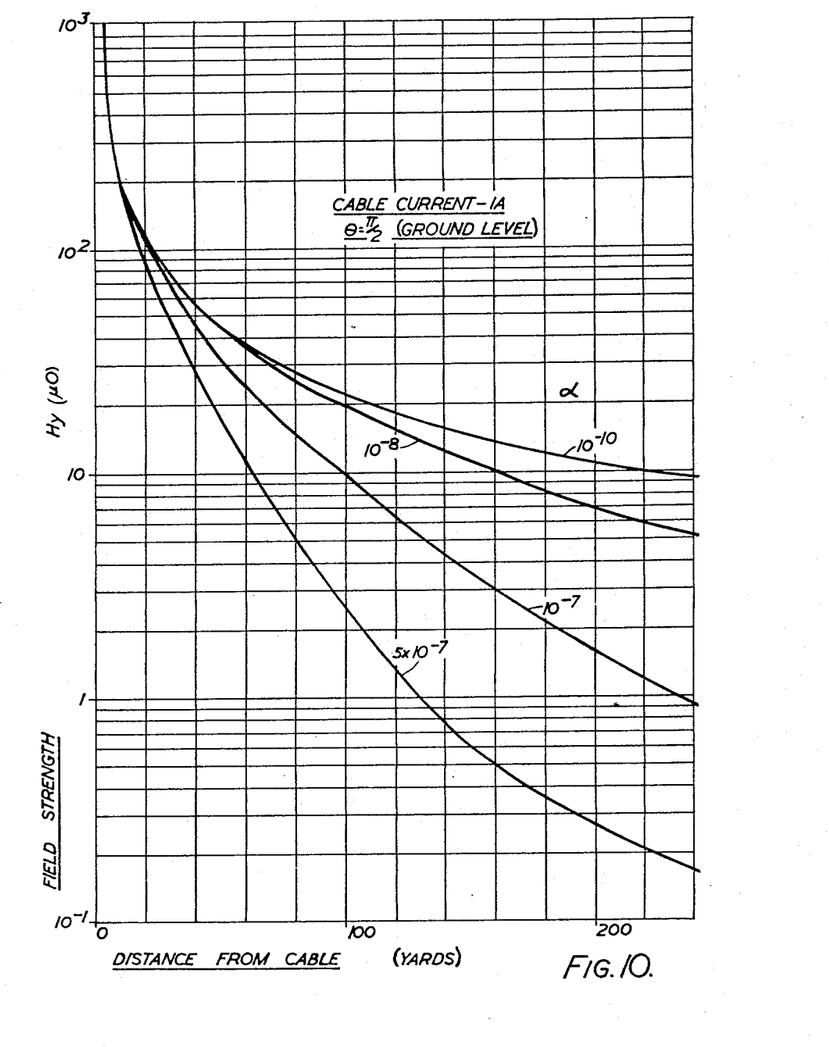

FIG. 9 presents a theoretical field pattern of the system with a single cable 1,200 yards in length and $\alpha=5\times10^{-9}$. The variation of field strength with distance from the cable for several values of $\alpha$ is given in FIGS. 5, 10 and 11.

Figure 11:
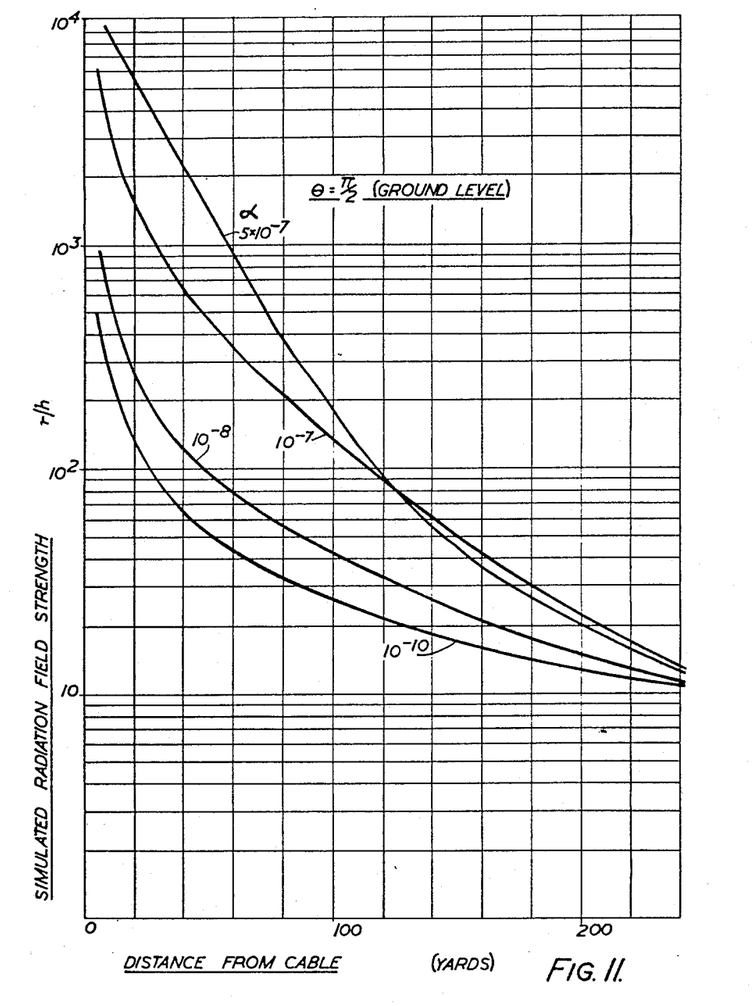

Since it is convenient for comparison all these curves have been related in FIG. 11 to an arbitrary value of 10 r./h. at a distance of 250 yards from the cable. Unless $\alpha>10^{-8}$, the 100–1,000 r./h. decade tends to be cramped close to the cable. This can be overcome by using two cables.

Figure 12:
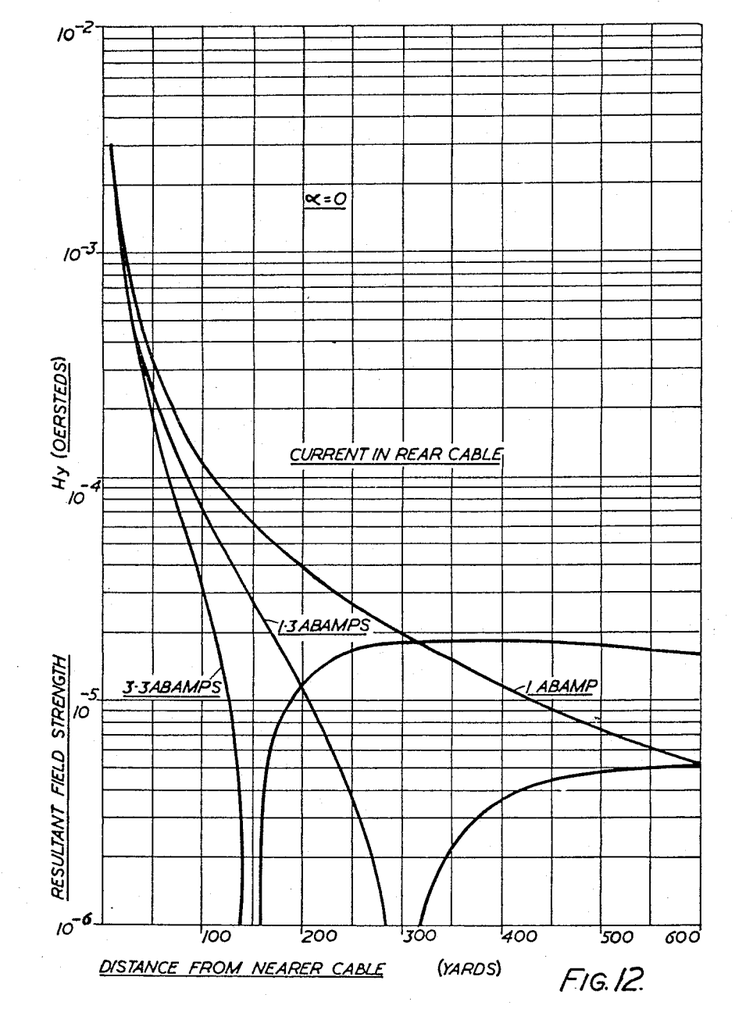

Another embodiment of the invention is the twin-cable earth-return system in which two parallel earthed cables are used with variable currents in antiphase. Relative variations of the currents cause a zero contour or locus of minima on one side of the cable layout to move with respect to it, enabling control of attenuation to be effected over a wide range. FIG. 12 shows for such an embodiment employing a cable separation of 100 yds. and a current of 1 abamp. in the nearer cable variation of signal strength with distance from the layout for several values of current in the other cable under the extreme condition when $\alpha=0$. The spurious fields on either side of the layout may be removed by adopting a two-frequency technique.

Figure 13:
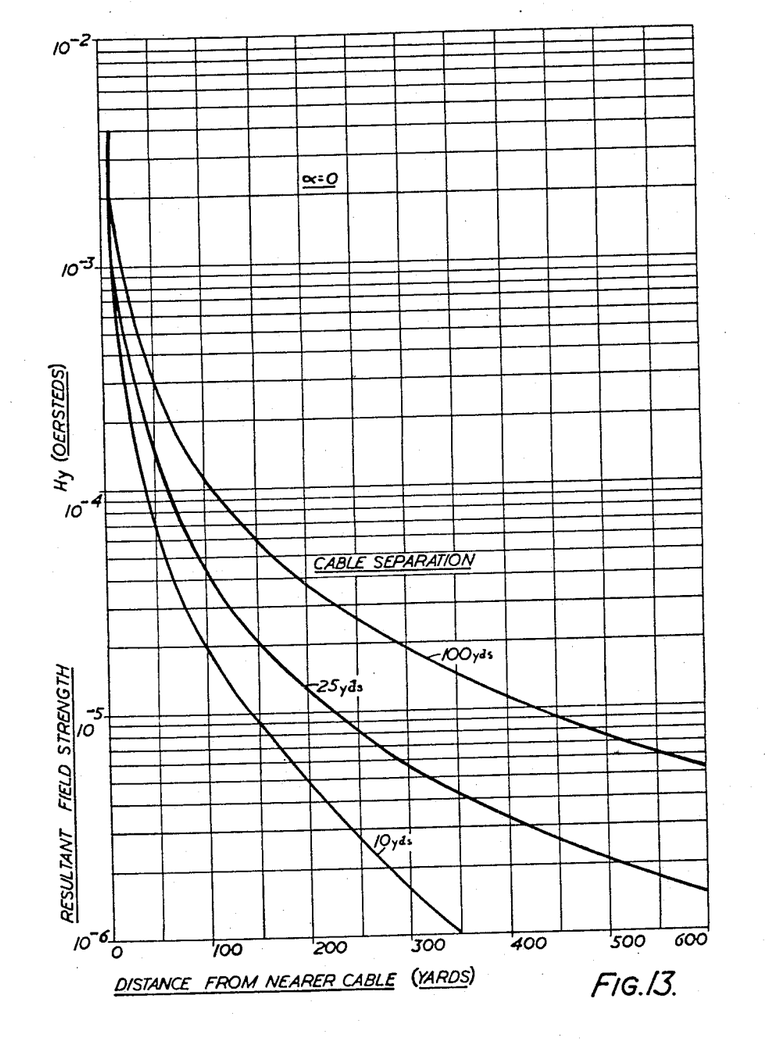

In some cases it may be preferable to alter the basic single-frequency twin-cable earth-return system by dispensing with the earthing installations and joining the two cables to form a rectangular loop. This has an obvious advantage in the physical layout, but control of the field attenuation has to be effected by the positioning of the cables. FIG. 13 shows the behaviour of the field with different cable separations and with a cable current of 1 abamp.

There are a number of considerations affecting the size of a layout. Radiac training exercises may be required to cover a wide range of scales. The training field may cover an area of say 5 miles by 3 miles, and even this may not represent an upper limit. There is the possibility of scaling down a full size pattern a convenient number of times, say 10 or 20, or alternatively that of simulating a small portion only in a limited space. A further suggestion has been made whereby an appropriate pattern might be scaled down and superimposed on a map on a table top.

It has been considered that "table top" experiments might be used to short circuit amounts of both theoretical and practical work. It was discovered that for these experiments to provide results of sufficient accuracy specific equipment would have to be designed for the purpose cancelling their advantage. However, there is no objection to miniaturised applications, and results obtained with adapted equipment showed considerable promise.

Most of the practical work to date has ben concerned with layouts of intermediate size, ranging over hundreds of yards involving both patterns of reduced scale and small full-size sections.

Figure 14:
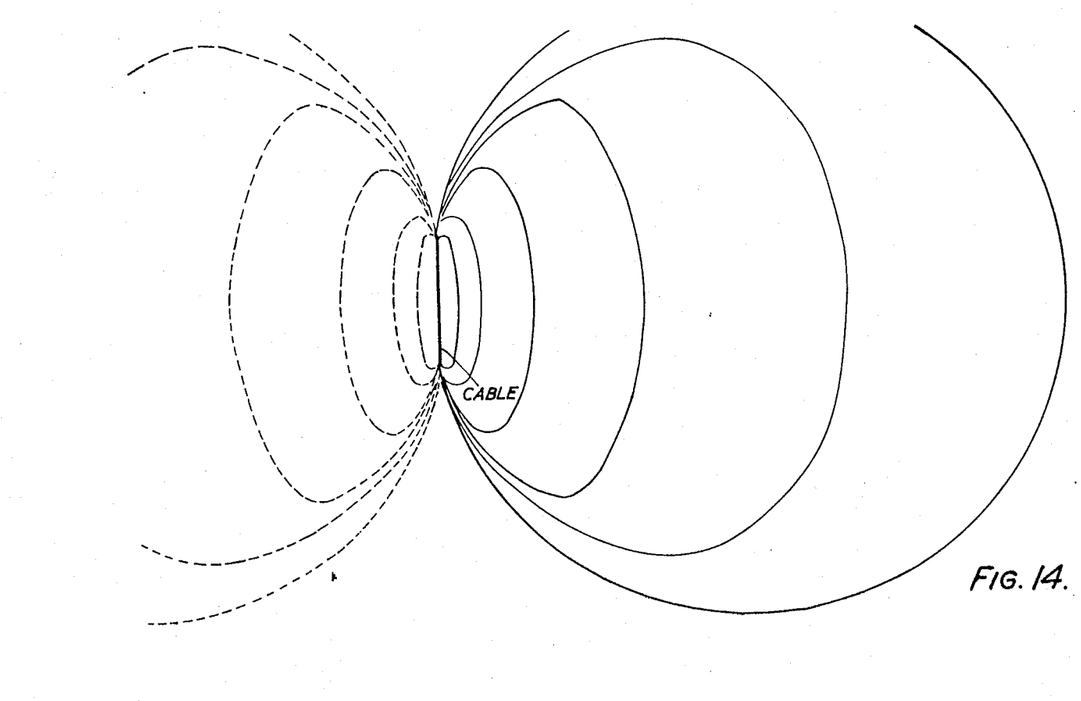

Yet other embodiments of the invention made use of straight-cable technique which, although primarily adapted for layouts simulating small sections at full scale, has an attractive application in long range work which is not immediately obvious. Loop systems are particularly versatile in the provision of specified field shapes, but are inclined to have high power consumption when used on a large scale since the basic circle tends to be self-cancelling. But if pattern requirements can be somewhat less stringent, a set of lobes can be produced by a straight cable of limited length. FIG. 14 shows a simplified estimated field pattern from a limited-length cable.

It is suggested therefore, that a simple system of this type would form the most convenient and economic basis for long-range work.

Consider the long-range characteristics of an infinite straight cable. Estimates of power and range are likely to be more realistic than in the loop case because of reduction in the number of unemphasised variables. The choice of field component to be used assumes paramount importance with a long range system. With intermediate ranges the vertical component is adopted because the horizontal coil is non-directional. Also with low values of $r\sqrt{\alpha}$ near the cable $H_y$ tends to $H_{max}$. At considerable distances from the cable $r\sqrt{\alpha}$ becomes large, $H_y$ tends to $H_{min}$ and $H_x$ tends to $H_{max}$. Hence the horizontal component becomes worthy of consideration.

Figure 15:
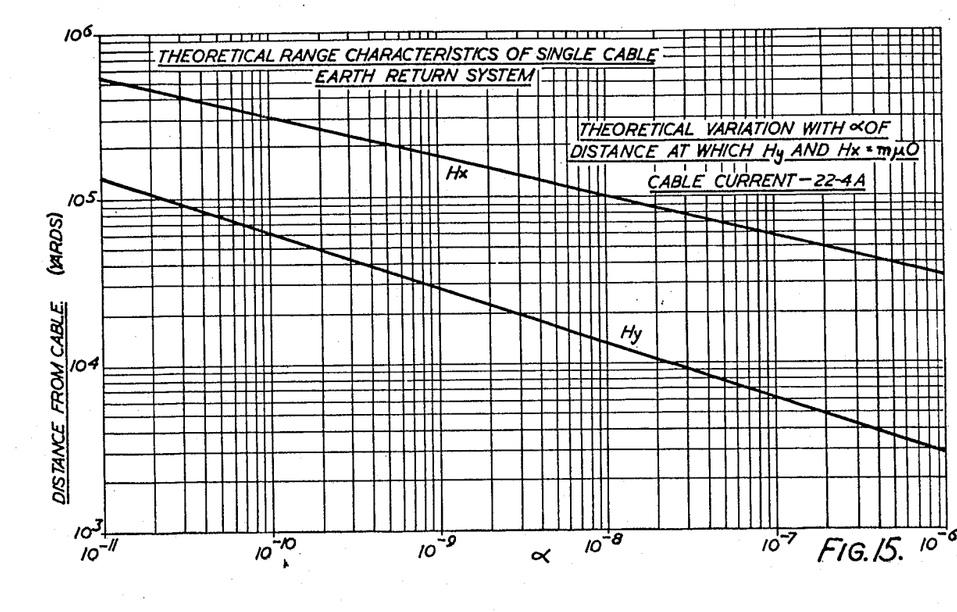

To give some idea in a preliminary approximation of how range is expected to vary with ground conductivity, FIG. 15 presents the theoretical range characteristics of a single-cable return system with the following conditions:

Power to cable layout ______________________ 1 kw.
Cable layout impedance ____________________ 2 ohms.
Cable current _____________________________ 22.4 A.
Minimum detectable field __________________ 1 m$\mu$O.

It will be appreciated that over considerable distances the field is liable to modification by the presence of power and telephone cables, buildings, etc., and that in many cases the range may be greater than the calculated value. This becomes a further argument in favour of a simple system in long-range work rather than one which makes provision for great versatility of pattern shape.

It is considered that 50 w. should be available for the cable, and the detector unit should have a sensitivity better than 100 $\mu$v. per r./h. The dosimeter requirement of integration provision up to 50 r. may be met utilising either resistance-capacitance technique or an integrating motor. In either case a voltage output is provided at a convenient location on the detector unit which may be indicated by plugging in a standard quartz-fibre dosimeter.

Figure 16:
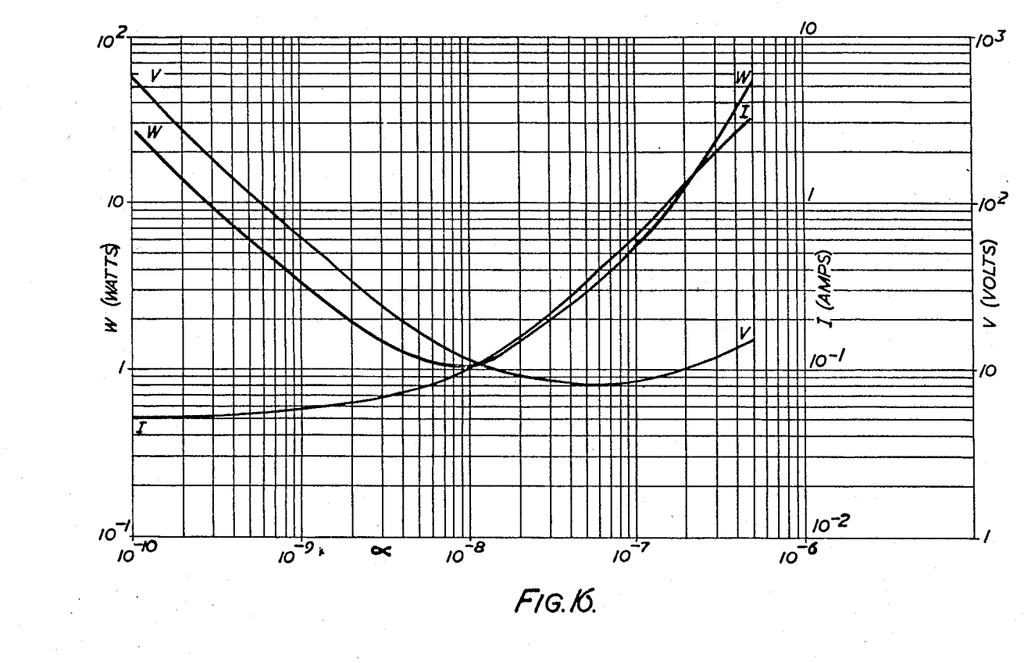

Referring to FIG. 16, which shows, for a single-cable earth-return system and f=kc./s., the theoretical variation of power voltage, and current of the cable installations with $\alpha$, using one 4 ft. earthing rod at each end of the cable, it will be seen that over a wide range of $\alpha$, the voltage necessary to excite the pertinent cable layout does not exceed the value required when $\alpha = 5 \times 10^{-7}$. Hence it becomes possible to dispense with multiple load impedance matching, provided that precautions are taken to ensure that excessive voltages are not developed accidentally.

However when $\alpha < 10^{-8}$, the attenuation-with-distance characteristic becomes less satisfactory, contours of larger value becoming bunched together near the cable (see FIG. 11). Under these circumstances it may be preferable to use the rectangular loop system. A maximum of 4,000 yds. of cable would be necessary, presenting a tuned resistive impedance of 10 ohms.

A power supply with provision for matching loads of 2.5, 5, and 10 ohms, therefore, covers all contingencies.

It has been observed that individual cable installations are liable to spasmodic impedance variations of ±30% about the nominal value. It is therefore necessary to ensure that the power supply has a sufficiently high output impedance to reduce these to less than 1% even under the reasonable degrees of mismatch discussed above. This is an important reason why an electronic power supply is to be preferred to an alternator.

The attenuation of the cable current with time according to the law can be conveniently effected by an automatic cam-operated inductive attenuator immediately preceding the power amplifier, a crystal being used as the basis of a frequency source. The precise operating frequency is not critically important on account of the bandwidth employed, but in order to standardise a frequency in conjunction with long-range requirements, a frequency of 1,025 c./s. has been chosen, which lies between two mains harmonics.

It is considered that the earthing equipment provided with each complete system should consist of two dozen earthing rods together with accessories to ensure a wide margin in meeting the specification under all conditions and to provide in favourable circumstances the possibility of increasing the range. In many cases "natural" earths such as ponds, rivers, water mains, etc. will be available for use subject to the obvious precautions.

Figure 17:
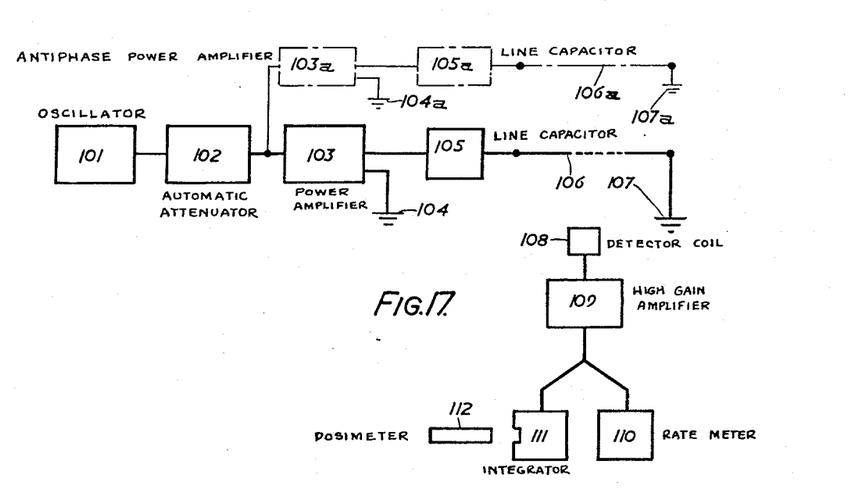

In the accompanying drawings FIGURE 17 is a block diagram showing a fallout simulator and a survey meter trainer for a single-cable earth return system. The fallout simulator comprises an oscillator 101 and an automatic attenuator 102, through which the oscillator output is fed to a power amplifier 103, which either has a high-impedance output or automatic gain control for the current output and is earthed at 104. The output of this power amplifier is supplied through a line capacitor 105 to the cable 106, the far end of which is earthed at 107. This cable, which may have any desired length, serves to establish the alternating magnetic field. The survey meter trainer, which is used to detect the magnetic field produced by the cable 106 at any given point, comprises a tuned detector coil 108, tuned to the frequency of the oscillator 101, which is connected to the input of a high-gain selective amplifier 109. The output of this amplifier is fed, either selectively or simultaneously, to a rate meter giving an indication in apparent roentgens/hour and to an integrator 111, which gives a cumulative indication in which apparent roentgens are represented as a voltage, 112 indicates a standard quartz-fibre dosimeter, which is used as a voltmeter to indicate roentgens on its graticule after being inserted into the integrator socket.

The twin-cable earth return system is substantially identical with the system just described except that, as indicated in chain dotted lines in FIG. 17, the power amplifier 103 and all elements following it are duplicated by similar elements 103A to 107A connected at anti-phase, 106A being the second cable. Alternatively a single amplifier having two output tappings in anti-phase may be employed instead of the two amplifiers 103 and 103A.

Figure 18:
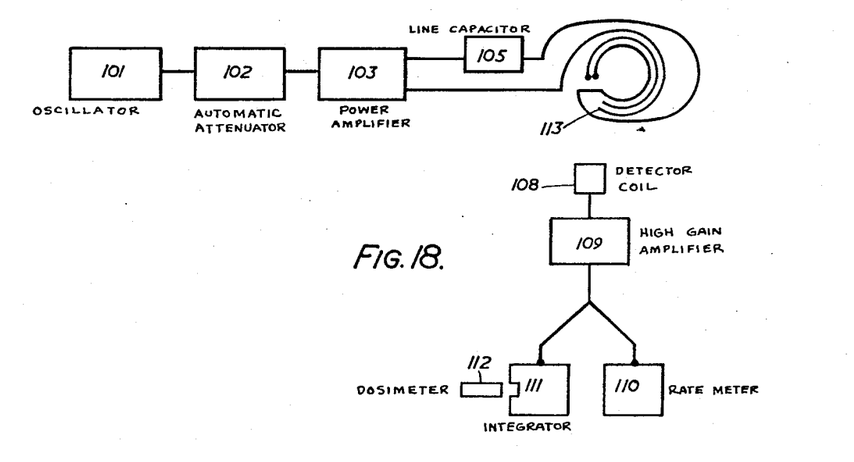

FIGURE 18 is a block diagram illustrating a single-frequency loop system. Elements identical with corresponding elements in FIGURE 17 have been indicated by the same reference numbers, and the loop cable layout has been indicated by the reference numeral 113. The survey meter trainer is exactly as in the embodiment of FIGURE 17.

The rectangular-loop system differs from the single-frequency loop system described with reference to FIGURE 18 only by the fact that one rectangular cable loop is used.

Figure 19:
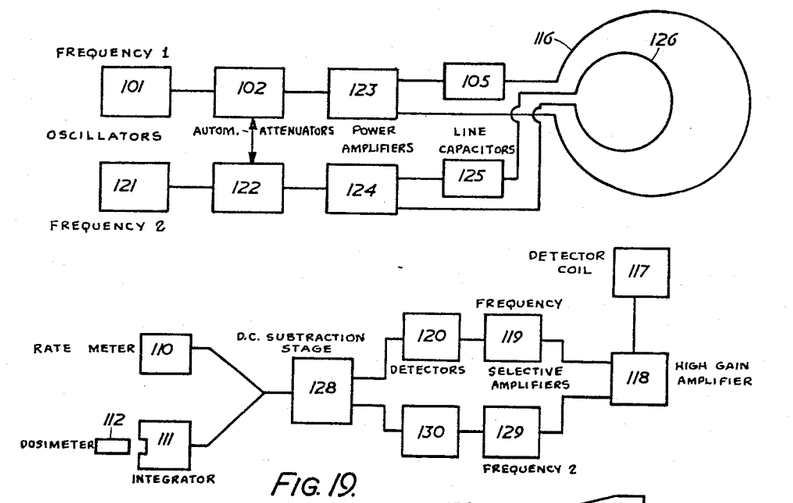

FIGURE 19 is a block diagram of a two-frequency loop system, again showing both the fall-out simulator and the survey meter trainer, parts corresponding to FIGURE 17 being indicated by the same reference numerals. The fall-out simulator includes for each of the two cable loops 116 and 126 a separate set of apparatus each of which, similarly to that shown in FIGURE 17, includes an oscillator 101 or 121 for the two frequencies respectively, an automatic attenuator 102 and 122 respectively, these two attenuators being ganged with each other, a power amplifier 123 and 124 respectively, with high impedance output, and a line capacitor 105 or 125. The survey meter trainer includes a detector coil 117 connected to a high-gain amplifier 118 having two outputs respectively fed to two selective amplifiers 119, 129 for the two oscillator frequencies, each selective amplifier feeding a separate detector 120 or 130. The outputs of these two detectors are both fed to a common D.-C. subtraction stage 128, which, similarly to the high-gain selective amplifier 109 in FIGURE 17, supplies jointly or selectively a rate meter 110 giving an indication in roentgens per hour and an integrator 111 supplying a voltage representing the total roentgens. This indicated voltage can be read again by a standard quartz-fibre dosimeter 112 which after insertion into the integrator socket gives a voltage reading but is calibrated to indicate roentgens on its graticule.

Figure 20:
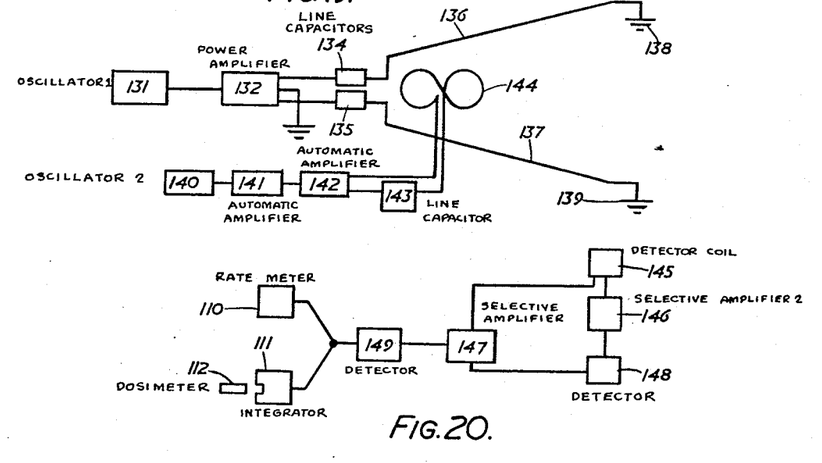

FIGURE 20 shows the block diagrams of the simulator and meter for a monitored gain-control system of the kind illustrated in FIGURE 7. Two frequencies are again used.

The first frequency is generated by an oscillator 131, which feeds a power amplifier 132 having a high output impedance. This power amplifier is earthed by an earthing installation 133 and has two output connections which, through line capacitors 134 and 135, are respectively connected to two control cables 136 and 137, the free ends of which are earthed at 138 and 139 respectively.

The other frequency is generated by an oscillator 140 which, through an automatic attenuator 141, feeds a power amplifier 142 having a high output impedance and supplying current, through a line capacitor 143, to the signal cable system 144.

In the survey meter trainer the detector coil 145 feeds in parallel two high-gain selective amplifiers 146 and 147, respectively tuned to the control cable frequency and to the signal cable frequency. The output of the amplifier 146, which amplifies the control-cable frequency used for monitoring purposes, is fed to a detector 148, and the detector output is connected to the signal frequency amplifier 147 to effect a gain control in that amplifier. The output of amplifier 147, thus monitored by the output of the amplifier 146, is fed to a detector 149 which feeds the rate meter 110 and integrator and dosimeter 111 and 112 as in FIGURE 17.

What we claim is:

1. An apparatus for simulating the measurement of nuclear weapon fall-out, comprising a cable adapted to be laid on the surface of the earth, means including an oscillator producing undamped oscillations of a predetermined audio frequency, an amplifier connected to said oscillator for feeding through said cable a current of such predetermined frequency, a variable attenuator for attenuating the amplitude of the current fed to the cable at a rate of not more than one decibel per minute, and at least one transportable survey apparatus adapted for resonance at said frequency for indicating a function of the local intensity of the magnetic field set up by passing such current through said cable.

2. Apparatus as claimed in claim 1, wherein said amplifier is a power amplifier having a high output impedance.

3. Apparatus as claimed in claim 1, including means for feeding a second cable with current of the same frequency in anti-phase.

4. Apparatus as claimed in claim 1, wherein the survey apparatus includes a standard quartz-fibre dosimeter, an integrator having output terminals presenting a voltage corresponding to the integrated field measurement and connector means for connecting said terminals to such standard quartz-fibre dosimeter for operation of said dosimeter as a voltmeter.

5. Apparatus as claimed in claim 4, wherein said standard quartz-fibre dosimeter is graduated in roentgens.

6. Apparatus as claimed in claim 1, including a survey apparatus for simulating in a constant-frequency magnetic field, the measurement of atomic-weapon fall-out, comprising a high-gain selective amplifier system having an input and an output, a detector coil connected to said input, and an indicating instrument connected to said output and graduated in roentgens per hour.

7. Apparatus as claimed in claim 1, wherein said amplifier is an amplifier having automatic gain-control to maintain the current output substantially independent of the load resistance.

8. Apparatus as claimed in claim 1, wherein the variable attenuator includes mechanically operated automatic attenuator means for reducing the output of said amplifier according to a predetermined decay law.

9. A survey apparatus for simulating, in a constant-frequency magnetic field, the measurement of atomic-weapon fall-out, comprising a high-gain selective amplifier system, having an input and an output, a detector coil connected to said input, and an integrating indicating instrument connected to the output of said amplifier system and graduated in simulated roentgens, wherein the indicating instrument comprises an integrator having output terminals presenting a voltage representing the roentgens, and a quartz-fibre dosimeter adapted for use as a voltmeter and graduated on its graticule to indicate simulated roentgens, said dosimeter having a pair of input terminals, and said integrator having a socket fitting said quartz-fibre dosimeter to connect said output terminals and input terminals.

10. A survey apparatus for simulating, in a constant-frequency magnetic field, the measurement of atomic-weapon fall-out, comprising two detector coils, a high gain selective amplifier system including two selective amplifiers connected to said two detector coils to be fed by the output thereof in parallel and adapted for respective response to two different predetermined audio-frequencies, two detector means respectively connected to the output of each said selective amplifier, a D.C.-subtraction stage connected to said two detector means to be fed by the respective outputs thereof, and an indicating instrument connected to be fed by the output of said D.C.-subtraction stage.

11. Apparatus as claimed in claim 10, wherein the subtraction stage includes means for suppressing any negative output.

12. Survey apparatus for simulating, in a constant-frequency magnetic field, the measurement of atomic-weapon fall-out, comprising a detector coil, two high-gain selective amplifiers, and an indicating instrument, wherein the output of said detector coil is fed in parallel to said two selective amplifiers said selective amplifiers being at least adapted to be tuned to two different predetermined frequencies, the apparatus also including detectors for the output of each said amplifier, the output of the detector for one of said predetermined frequencies being fed to the selective amplifier for the other frequency to effect a gain control in said last-named amplifier, to monitor the output of the second frequency which output, through the associated detector, is fed to the indicating instrument.

References Cited in the file of this patent

UNITED STATES PATENTS

| | | |
|---|---|---|
| 1,241,963 | Grove | Oct. 2, 1917 |
| 1,297,929 | Taylor | Mar. 18, 1919 |
| 1,322,622 | Rogers et al. | Nov. 25, 1919 |
| 1,461,492 | Moody | July 10, 1923 |
| 1,818,331 | Jakosky | Aug. 11, 1931 |
| 1,820,953 | Sundberg | Sept. 1, 1931 |
| 2,148,389 | Yonkers | Feb. 21, 1939 |
| 2,408,029 | Bazzoni et al. | Sept. 24, 1946 |
| 2,661,466 | Barret | Dec. 1, 1953 |
| 2,671,610 | Sweer | Mar. 9, 1954 |
| 2,731,596 | Wait et al. | Jan. 17, 1956 |
| 2,789,268 | Bechtel et al. | Apr. 16, 1957 |
| 2,929,984 | Puranen et al. | Mar. 22, 1960 |